United States Patent
Lee et al.

(10) Patent No.: US 8,411,063 B2
(45) Date of Patent: Apr. 2, 2013

(54) SENSING ELECTRODE LAYER AND DISPLAY PANEL

(75) Inventors: Ming-Shian Lee, Nantou County (TW); Shih-Po Chou, Kaohsiung County (TW); Tun-Chun Yang, Taipei (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 942 days.

(21) Appl. No.: 12/405,242

(22) Filed: Mar. 17, 2009

(65) Prior Publication Data

US 2010/0123680 A1 May 20, 2010

(30) Foreign Application Priority Data

Nov. 17, 2008 (TW) .............................. 97144395 A (51) Int. Cl.
*G06F 3/044* (2006.01)
(52) U.S. Cl. ...................................................... 345/174
(58) Field of Classification Search ........................ None
See application file for complete search history.

(56) References Cited

U.S. PATENT DOCUMENTS

| 6,914,640 | B2 | 7/2005 | Yu |
| 7,215,331 | B2 | 5/2007 | Song et al. |
| 7,932,898 | B2 * | 4/2011 | Philipp et al. ................. 345/174 |
| 2003/0095111 | A1 | 5/2003 | Song et al. |
| 2003/0122800 | A1 | 7/2003 | Yu |
| 2007/0062739 | A1 | 3/2007 | Philipp et al. |
| 2008/0062148 | A1 * | 3/2008 | Hotelling et al. ............. 345/174 |
| 2009/0160822 | A1 * | 6/2009 | Eguchi et al. ................. 345/174 |
| 2010/0073319 | A1 * | 3/2010 | Lyon et al. .................... 345/174 |

FOREIGN PATENT DOCUMENTS

| TW | 571288 | 1/2004 |
| TW | I234676 | 6/2005 |

OTHER PUBLICATIONS

"Office Action of Taiwan Counterpart Application", issued on Jun. 27, 2012, p. 1-p. 9, in which the listed references were cited.

* cited by examiner

*Primary Examiner* — Joseph Haley
*Assistant Examiner* — Emily Frank
(74) *Attorney, Agent, or Firm* — WPAT PC; Justin King (57) ABSTRACT

A display panel includes a first substrate, a second substrate, and a display medium. The display medium is sandwiched between the first substrate and the second substrate. The first substrate has a pixel array. The second substrate includes first sensing electrodes arranged in a first direction and second sensing electrodes arranged in a second direction. Each of the first sensing electrodes is formed by alternately arranging first upper sensing electrode patterns and first lower shading electrode patterns. Each of the first upper sensing electrode patterns is electrically connected to the adjacent first lower shading electrode patterns. Each of the second sensing electrodes is formed by alternately arranging second upper sensing electrode patterns and second lower shading electrode patterns. Each of the second upper sensing electrode patterns is electrically connected to the adjacent second lower shading electrode patterns.

20 Claims, 6 Drawing Sheets

SENSING ELECTRODE LAYER AND DISPLAY PANEL

CROSS-REFERENCE TO RELATED APPLICATION

This application claims the priority benefit of Taiwan application serial no. 97144395, filed Nov. 17, 2008. The entirety of the above-mentioned patent application is hereby incorporated by reference herein and made a part of this specification.

BACKGROUND OF THE INVENTION

1. Field of the Invention

The present invention relates to a sensing electrode layer and a display panel. More particularly, the present invention relates to a sensing electrode layer capable of reducing parasitic capacitance between the sensing electrode layer and an electrode layer in a display panel and a display panel having the sensing electrode layer.

2. Description of Related Art

Based on sensing functions, conventional sensing display panels are usually categorized into capacitance sensing display panels, resistance sensing display panels, and photosensitive sensing display panels. On the other hand, the sensing display panels can be classified into an added type and an integrated type based on structures of the sensing display panels. Owing to a higher aperture ratio and a greater signal-to-noise ratio, the capacitance sensing display panel has become the mainstream sensing display panel in the market at this current stage. Besides, the integrated type sensing display panel is thinner and lighter than the added type sensing display panel. Hence, in view of the above, specifications and performance of an integrated type capacitance sensing display panel are rather satisfactory.

Figure 1:
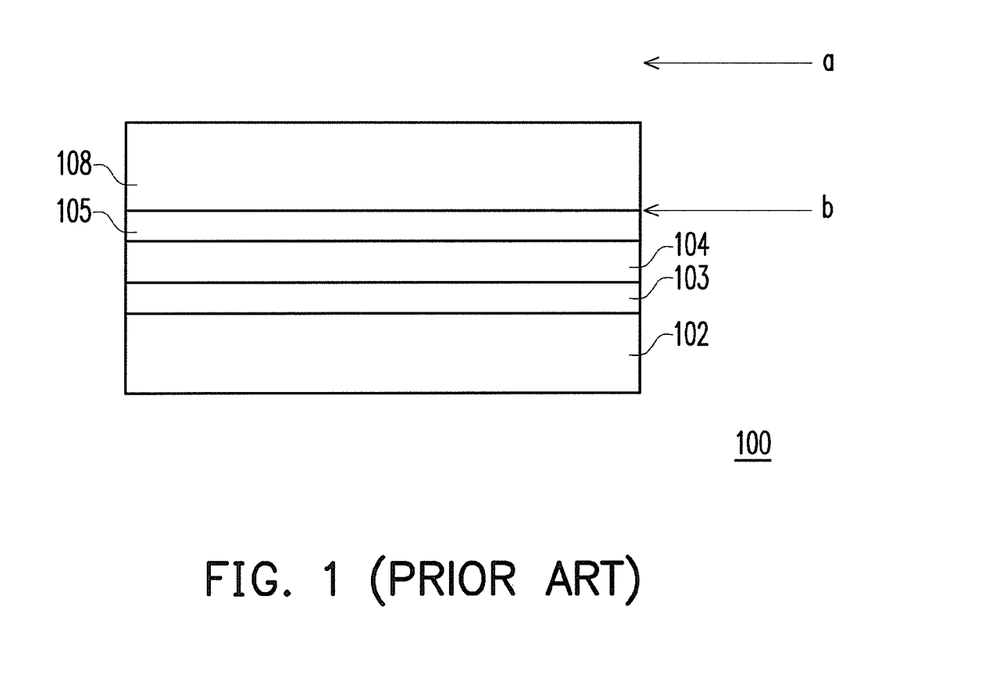
FIG. 1 is a schematic cross-sectional view of a conventional LCD panel.

FIG. 1 is a schematic cross-sectional view of a conventional liquid crystal display (LCD) panel. Referring to FIG. 1, a conventional LCD panel 100 includes a first substrate 102, a pixel array 103, a liquid crystal (LC) layer 104, an indium-tin-oxide (ITO) electrode film 105, and a second substrate 108. The pixel array 103 is disposed on the first substrate 102. The electrode film 105 is disposed on the second substrate 108. The LC layer 104 is sandwiched between the first substrate 102 and the second substrate 108.

Conventionally, an integrated type capacitance sensing display panel is usually integrated into the LCD panel 100 at position a or b respectively indicated in FIG. 1.

However, with current demands on lightness, slimness, and compactness of consumer electronic products, glass in the LCD panel is required to be thinned out. Therefore, when a capacitance sensing electrode is integrated at the position a shown in FIG. 1, the glass of the LCD panel 100 which has been thinned out gives rise to an increase in parasitic capacitance between a sensing electrode and the electrode film 105. As such, scan signals obtained by performing the sensing function and driving signals of the LCD panel are coupling, such that signal errors occur when the displaying and sensing functions are performed. On the other hand, when the capacitance sensing electrode is integrated at the position b, an issue of parasitic capacitance is even worse because a distance between the sensing electrode and the electrode film 105 is reduced, and thereby a signal coupling problem becomes much more serious.

SUMMARY OF THE INVENTION

Accordingly, the present invention is directed to a sensing electrode layer capable of reducing parasitic capacitance between a sensing electrode and an electrode film in a display panel.

The present invention is further directed to a display panel having said sensing electrode layer.

In the present invention, a display panel including a first substrate, a second substrate, and a display medium is provided. The display medium is sandwiched between the first substrate and the second substrate. A pixel array is disposed on the first substrate. A sensing electrode layer is disposed on the second substrate. The sensing electrode layer includes a plurality of first sensing electrodes and a plurality of second sensing electrodes. The first sensing electrodes are arranged in a first direction. Each of the first sensing electrodes is constituted by alternately arranging a plurality of first upper sensing electrode patterns and a plurality of first lower shading electrode patterns, and each of the first upper sensing electrode patterns is electrically connected to the adjacent first lower shading electrode patterns. The second sensing electrodes are arranged in a second direction. Each of the second sensing electrodes is constituted by alternately arranging a plurality of second upper sensing electrode patterns and a plurality of second lower shading electrode patterns, and each of the second upper sensing electrode patterns is electrically connected to the adjacent second lower shading electrode patterns.

According to an embodiment of the present invention, the display panel further includes a passivation layer and an electrode film. The passivation layer covers the sensing electrode layer, and the electrode film is located on the passivation layer.

According to an embodiment of the present invention, a thickness of the passivation layer disposed between the sensing electrode layer and the electrode film ranges from 10 μm to 50 μm.

According to an embodiment of the present invention, each of the first upper sensing electrode patterns is disposed above the corresponding second lower shading electrode pattern.

According to an embodiment of the present invention, the first upper sensing electrode patterns and the second upper sensing electrode patterns are co-planar, and the first lower shading electrode patterns and the second lower shading electrode patterns are co-planar.

According to an embodiment of the present invention, dimensions of the first upper sensing electrode patterns are substantially the same as dimensions of the second lower shading electrode patterns, and dimensions of the second upper sensing electrode patterns are substantially the same as dimensions of the first lower shading electrode patterns.

According to an embodiment of the present invention, an area of each of the first upper sensing electrode patterns, an area of each of the first lower shading electrode patterns, an area of each of the second upper sensing electrode patterns, or an area of each of the second lower shading electrode patterns is ½~⅔ of a unit sensing area.

According to an embodiment of the present invention, the display panel further includes a plurality of first contact structures and a plurality of second contact structures. Each of the first contact structures is located between the first upper sensing electrode pattern and the first lower shading electrode pattern adjacent to each other, so as to electrically connect the first upper sensing electrode pattern and the first lower shading electrode pattern. Each of the second contact structures is located between the second upper sensing electrode pattern and the second lower shading electrode pattern adjacent to each other, so as to electrically connect the second upper sensing electrode pattern and the second lower shading electrode pattern.

According to an embodiment of the present invention, each of the first contact structures and each of the second contact structures are at least a contact plug or a continuous contact structure.

According to an embodiment of the present invention, the display panel further includes a plurality of peripheral circuits, each of which is electrically connected to one of the first sensing electrodes or one of the second sensing electrodes.

According to an embodiment of the present invention, the sensing electrode layer is divided into at least two regions, and the first sensing electrodes and the second sensing electrodes located in one of the at least two regions are electrically insulated from the first sensing electrodes and the second sensing electrodes located in the other of the at least two regions.

According to an embodiment of the present invention, the display panel further includes a plurality of peripheral circuits, each of which is electrically connected to one of the first sensing electrodes or one of the second sensing electrodes in each of the at least two regions.

According to an embodiment of the present invention, a material of the first sensing electrodes and the second sensing electrodes includes a transparent conductive material or metal.

In the present invention, a sensing electrode layer including a plurality of first sensing units and a plurality of second sensing units is further provided. The second sensing units and the first sensing units are alternately arranged. Each of the first sensing units includes a first upper sensing electrode pattern and a second lower shading electrode pattern, and the first upper sensing electrode pattern and the second lower shading electrode pattern are overlapped. Each of the second sensing units includes a second upper sensing electrode pattern and a first lower shading electrode pattern, and the second upper sensing electrode pattern and the first lower shading electrode pattern are overlapped. Specifically, the first upper sensing electrode patterns and the first lower shading electrode patterns located in the same row are electrically connected, and the second upper sensing electrode patterns and the second lower shading electrode patterns located in the same column are electrically connected.

According to an embodiment of the present invention, the first upper sensing electrode pattern and the second lower shading electrode pattern overlapped to each other have same signals.

According to an embodiment of the present invention, the second upper sensing electrode pattern and the first lower shading electrode pattern overlapped to each other have same signals.

According to an embodiment of the present invention, an insulating layer is further disposed between the first upper sensing electrode pattern and the second lower shading electrode pattern overlapped to each other.

According to an embodiment of the present invention, an insulating layer is further disposed between the second upper sensing electrode pattern and the first lower shading electrode pattern overlapped to each other.

According to an embodiment of the present invention, a dimension of the first upper sensing electrode pattern is substantially the same as a dimension of the second lower shading electrode pattern, and a dimension of the second upper sensing electrode pattern is substantially the same as a dimension of the first lower shading electrode pattern.

According to an embodiment of the present invention, at least a first contact structure is further disposed between the first upper sensing electrode patterns and the first lower shading electrode patterns located in the same row to electrically connect the first upper sensing electrode patterns and the first lower shading electrode patterns. Besides, at least a second contact structure is further disposed between the second upper sensing electrode patterns and the second lower shading electrode patterns in the same column to electrically connect the second upper sensing electrode patterns and the second lower shading electrode patterns.

According to an embodiment of the present invention, the at least a first contact structure and the at least a second contact structure are at least a contact plug or a continuous contact structure.

In light of the foregoing, the sensing electrode layer of the present invention has the overlapped sensing electrode patterns and shading electrode patterns. The shading electrode patterns are able to shield the parasitic capacitance between the sensing electrode patterns and the electrode films, and therefore sensitivity of the sensing electrodes can be improved.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

First Embodiment

Figure 2:
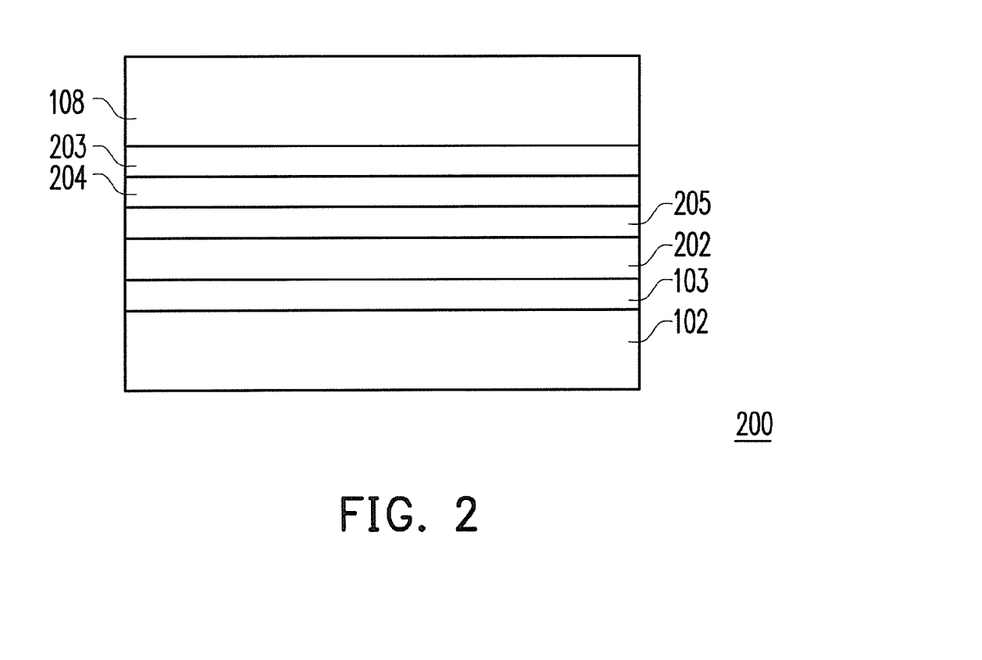
FIG. 2 is a schematic cross-sectional view of a display panel according to a first embodiment of the present invention.

FIG. 2 is a schematic cross-sectional view of a display panel according to a first embodiment of the present invention. Referring to FIG. 2, a display panel 200 of the present embodiment includes a first substrate 102, a pixel array 103, a second substrate 108, a display medium 202, and a sensing electrode layer 203.

The first substrate 102 and the second substrate 108 can be respectively made of glass, plastic, silicon, metal, and other materials suitable for making substrates. The second substrate 108 is disposed opposite to the first substrate 102.

The pixel array 103 is disposed on the first substrate 102. In addition, the pixel array 103 is formed by arranging a plurality of pixel structures and includes a plurality of active devices, a plurality of scan lines, a plurality of data lines, and a plurality of pixel electrodes (not shown). The active devices are electrically connected to the scan lines and the data lines, and the pixel electrodes are electrically connected to the corresponding active device. The active devices can be top-gate thin film transistors (TFTs), bottom-gate TFTs, amorphous silicon TFTs, or low temperature polysilicon TFTs.

The display medium 202 can be a liquid crystal material or an electro-luminescent material. When the display medium 202 is made of the liquid crystal material, the display panel 200 is referred to as an LCD panel (e.g. a transmissive display panel, a transflective display panel, a reflective display panel, a color-filter-on-array (COA) display panel, an array-on-color-filter (AOC) display panel, a vertically aligned (VA) display panel, an in-plane switch (IPS) display panel, a multi-domain vertically aligned (MVA) display panel, a twist nematic (TN) display panel, a super twist nematic (STN) display panel, a patterned-silt vertically aligned (PVA) display panel, a super patterned-silt vertically aligned (S-PVA) display panel, an advance super view (ASV) display panel, a fringe field switching (FFS) display panel, a continuous pinwheel alignment (CPA) display panel, an ASM display panel, an OCB display panel, an S-IPS display panel, an axially symmetric aligned micro-cell mode (AS-IPS) display panel, an ultra-fringe field switching (UFFS) display panel, a polymer stabilized alignment (PSA) display panel, a dual-view display panel, a triple-view display panel, a three-dimensional display panel, any other display panel, or a combination thereof. In contradistinction, given that the display medium 202 is made of the electro-luminescent material, the display panel 200 is referred to as an electro-luminescent display panel (e.g. a fluorescent electro-luminescent display panel, a phosphor electro-luminescent display panel, or a combination thereof). Here, the electro-luminescent material includes an organic material, an inorganic material, or a combination thereof. Furthermore, molecules of said electro-luminescent material include small molecules, polymers, or a combination thereof.

Figure 3:
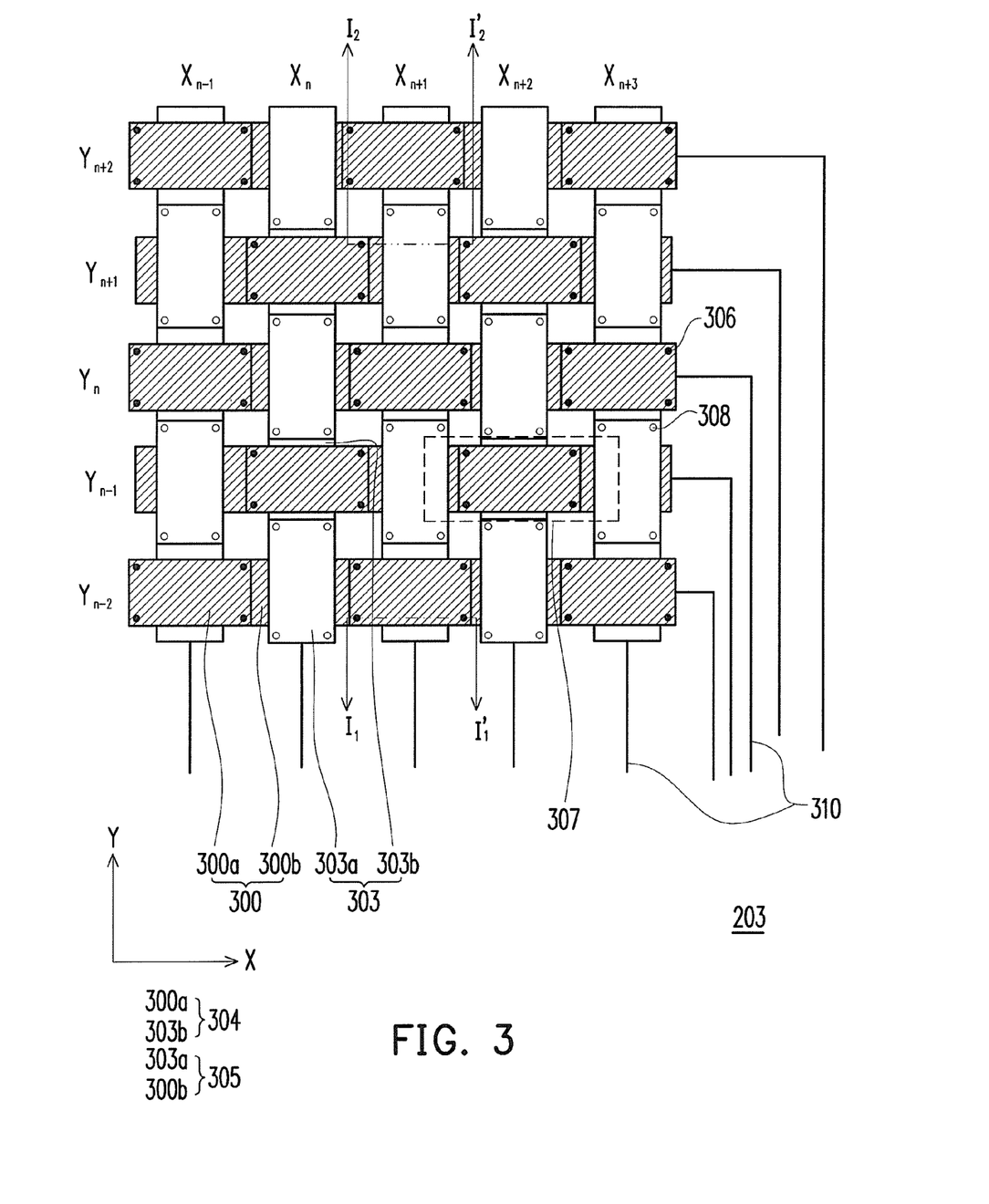
FIG. 3 is a schematic top view of the sensing electrode layer depicted in FIG. 2.

The sensing electrode layer 203 is disposed on the second substrate 108. FIG. 3 is a schematic top view of the sensing electrode layer in the display panel depicted in FIG. 2. Referring to FIGS. 2 and 3, the sensing electrode layer 203 includes a plurality of first sensing electrodes 300, a plurality of second sensing electrodes 303, and a plurality of peripheral circuits 310. The first sensing electrodes 300 are arranged along a first direction. The second sensing electrodes 303 are arranged along a second direction. According to the present embodiment, the first direction and the second direction are exemplified as the X direction and the Y direction, respectively.

Based on the above, the first sensing electrodes 300 are electrically insulated from the second sensing electrodes 303. In addition, each of the first sensing electrodes 300 and each of the second sensing electrodes 303 are electrically connected to one of the corresponding peripheral circuits 310, respectively. Through the peripheral circuits 310, signals can be input into and output from the first sensing electrodes 300 and the second sensing electrodes 303. Moreover, a material of the first sensing electrodes 300 and the second sensing electrodes 303 includes a transparent conductive material or metal. According to the embodiment depicted in FIG. 3, the first sensing electrodes 300 and the second sensing electrodes 303 are made of the transparent conductive material. By contrast, in other embodiments, when the first sensing electrodes 300 and the second sensing electrodes 303 are made of metal, a plurality of transparent opening patterns are further formed in the first sensing electrodes 300 and the second sensing electrodes 303. Each of the transparent opening patterns is corresponding to each of the pixel structures in the pixel array.

To be more specific, each of the first sensing electrodes 300 is formed by alternately arranging a plurality of first upper sensing electrode patterns 300a and a plurality of first lower shading electrode patterns 300b. Each of the first upper sensing electrode patterns 300a is electrically connected to the adjacent first lower shading electrode patterns 300b. Besides, each of the second sensing electrodes 303 is formed by alternately arranging a plurality of second upper sensing electrode patterns 303a and a plurality of second lower shading electrode patterns 303b. Each of the second upper sensing electrode patterns 303a is electrically connected to the adjacent second lower shading electrode patterns 303b. Here, each of the first upper sensing electrode patterns 300a and the underlying second lower shading electrode pattern 303b together form a first sensing unit 304. Each of the second upper sensing electrode patterns 303a and the underlying first lower shading electrode pattern 300b together form a second sensing unit 305.

Additionally, referring to FIG. 2, according to an embodiment of the present invention, a passivation layer 204 and an electrode film 205 are further disposed on the second substrate 108. The passivation layer 204 covers the sensing electrode layer 203. The electrode film 205 is located on the passivation layer 204. In another embodiment, a color filter layer (not shown) is further disposed on the second substrate 108. The color filter layer covers the sensing electrode layer 203. Here, the color filter layer is constituted by a green filter layer, a blue filter layer, and a red filter layer, for example.

Particularly, in the present embodiment, the disposition of the passivation layer 204 brings about an increase in distance between the sensing electrode layer 203 and the electrode film 205, and thereby a value of the parasitic capacitance is reduced. According to an embodiment, a thickness of the passivation layer 204 ranges from 10 μm to 50 μm, preferably 20 μm.

In addition, according to the present embodiment, an area of each of the first upper sensing electrode patterns 300a, an area of each of the first lower shading electrode patterns 300b, an area of each of the second upper sensing electrode patterns 303a, or an area of each of the second lower shading electrode patterns 303b is ½~⅔ of a unit sensing area 307. Generally, one unit sensing area 307 is approximately 0.5 mm×0.5 mm, which is as large as a human finger. The area of the sensing electrode patterns 300a and 303a is mainly designed for accurately identifying sensing positions, which is elaborated hereinafter.

Referring to FIG. 3, a coordinate $(X_n, Y_n)$ defines a location where the second upper sensing electrode pattern 303a and the first lower shading electrode pattern 300b are overlapped and a location where the first upper sensing electrode pattern 300a and the second lower shading electrode pattern 303b are overlapped. Namely, the coordinate $(X_n, Y_n)$ defines positions of the sensing units 304 and 305. For instance, when a human finger contacts a location corresponding to the coordinate $(X_{n+2}, Y_{n-1})$, the second lower shading electrode pattern 303b at the position $Y_{n-1}$ cannot sense the finger contact because the second lower shading electrode pattern 303b is shielded by the first upper sensing electrode pattern 300a. Thereby, the X coordinate is not likely to be determined. In other words, the X coordinate must be determined by sensing capacitance which is induced by a contact between the finger and the second upper sensing electrode pattern 303a at an adjacent location corresponding to the coordinate $(X_{n+1}, Y_{n-1})$ or ($X_{n+3}, Y_{n-1}$). Hence, to avoid the sensing electrode patterns from incapability of sensing at X or Y direction, each of the sensing electrodes cannot be oversized. Specifically, the area occupied by the sensing electrode patterns in the sensing electrode layer is preferably ½~⅔ of the unit sensing area.

Figure 4:
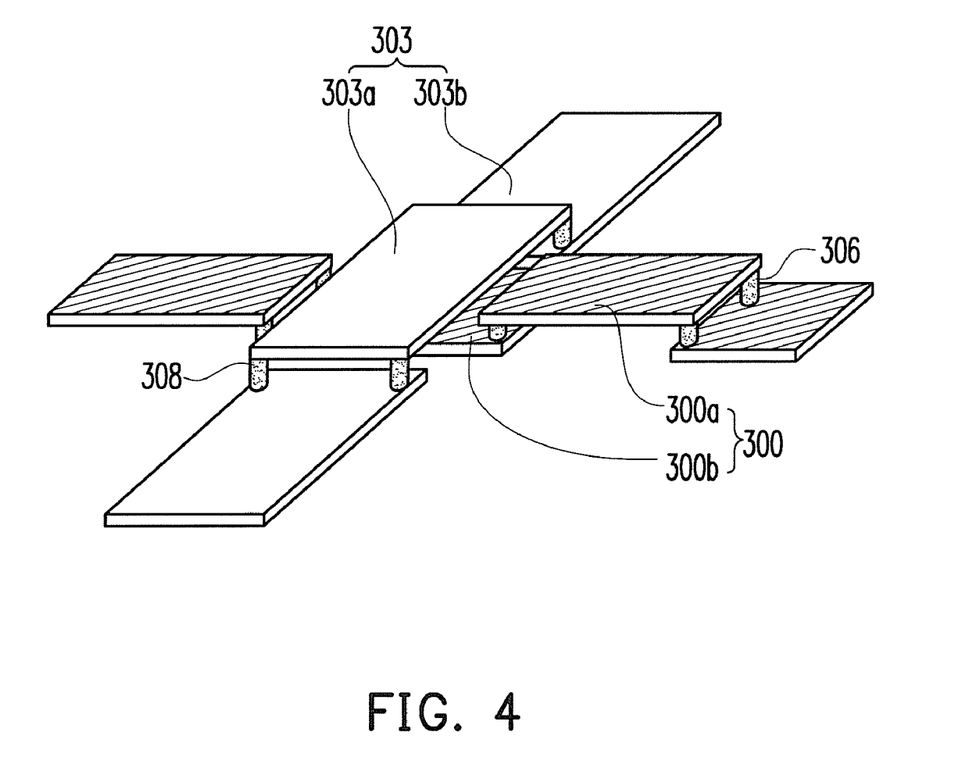
FIG. 4 is a three-dimensional partial enlarged view of FIG. 3.
Figure 5A:
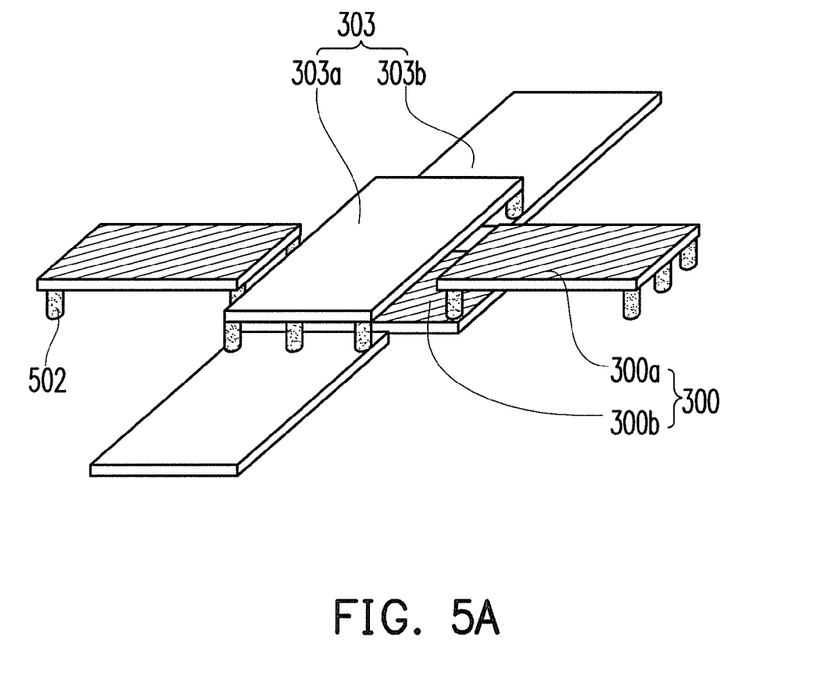
FIGS. 5A and 5B are schematic views illustrating other two structures of the contact structure depicted in FIG. 4.
Figure 5B:
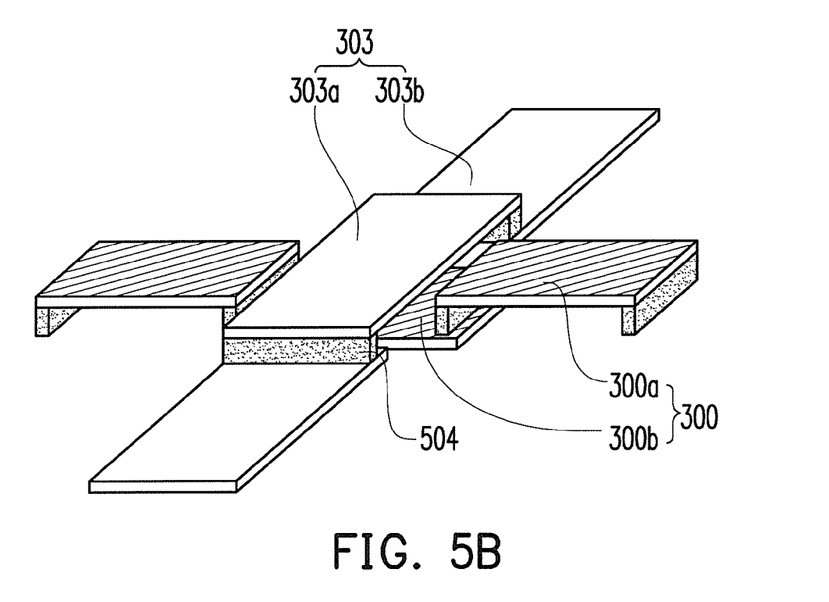

A three-dimensional view and a cross-sectional view are provided hereinafter to detail the sensing electrode layer of the present invention. FIG. 4 is a three-dimensional partial enlarged view of the sensing electrode layer depicted in FIG. 3. Referring to FIGS. 3 and 4, in the present embodiment, the first upper sensing electrode patterns 300a and the second upper sensing electrode patterns 303a are co-planar, and the first lower shading electrode patterns 300b and the second lower shading electrode patterns 303b are co-planar. Besides, dimensions of the first upper sensing electrode patterns 300a are substantially the same as dimensions of the second lower shading electrode patterns 303b, and dimensions of the second upper sensing electrode patterns 303a are substantially the same as dimensions of the first lower shading electrode patterns 300b. Moreover, in the present embodiment, the first upper sensing electrode patterns 300a and the first lower shading electrode patterns 300b in the same row are electrically connected through a plurality of first contact structures 306, and the second upper sensing electrode patterns 303a and the second lower shading electrode patterns 303b in the same column are electrically connected through a plurality of second contact structures 308. According to the present embodiment, each of the first contact structures 306 and each of the second contact structures 308 are two contact plugs. However, in other embodiments, each of the first contact structures 306 and each of the second contact structures 308 can respectively be a contact plug, three contact plugs, or more than three contact plugs (as indicated in FIG. 5A). In addition, each of the first contact structures 306 and each of the second contact structures 308 can also be a continuous contact structure for electrically connecting the electrode layer that is disposed two layers below, which is depicted in FIG. 5B.

Figure 6A:
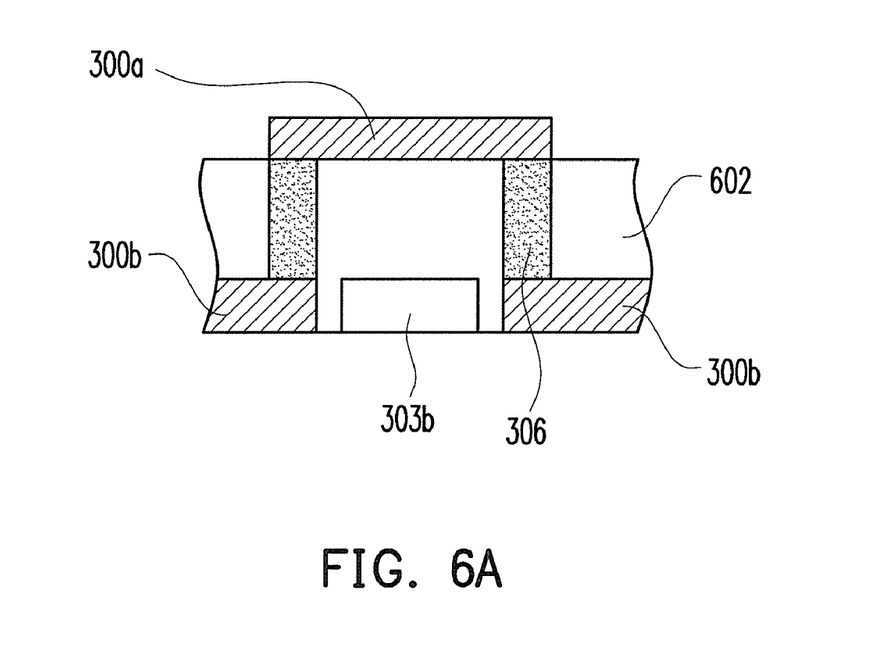
FIG. 6A is a schematic cross-sectional view taken along a section line $I_1$-$I_1$' in FIG. 3.
Figure 6B:
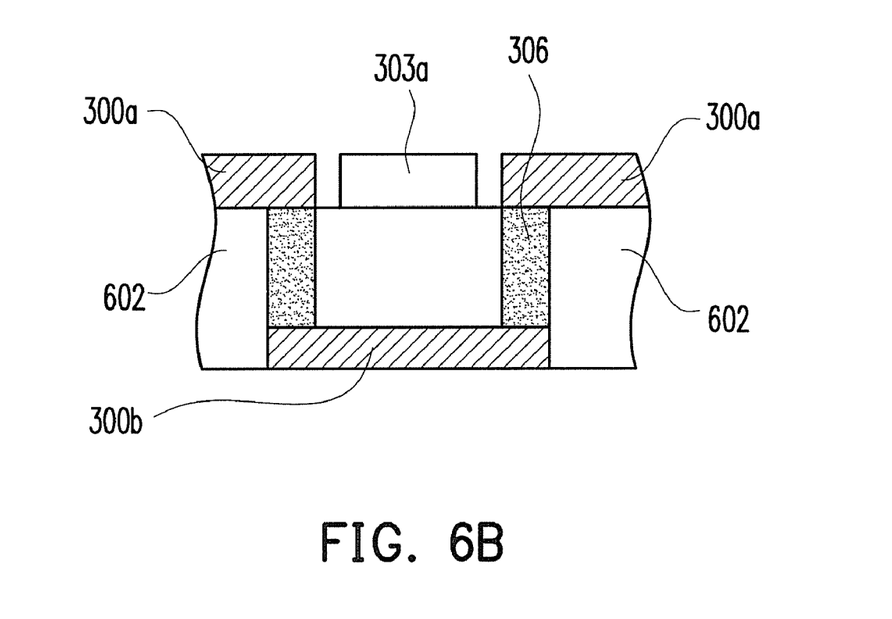
FIG. 6B is a schematic cross-sectional view taken along a section line $I_2$-$I_2$' in FIG. 3.

On the other hand, FIG. 6A is a schematic cross-sectional view taken along a section line $I_1$-$I_1'$ FIG. 3, and FIG. 6B is a schematic cross-sectional view taken along a section line $I_2$-$I_2'$ in FIG. 3. As indicated in FIGS. 3, 6A, and 6B, in the present embodiment, an insulating layer 602 is further disposed between the first upper sensing electrode pattern 300a and the second lower shading electrode pattern 303b. Additionally, an insulating layer 602 is also disposed between the second upper sensing electrode pattern 303a and the first lower shading electrode pattern 300b. During the sensing operation, the first upper sensing electrode pattern 300a and the second lower shading electrode pattern 303b overlapped to each other have the same signals. Besides, the second upper sensing electrode pattern 303a and the first lower shading electrode pattern 300b overlapped to each other have the same signals as well. As two overlapped conductive layers have the same voltage levels or the same voltage signals, there exists no parasitic capacitance between the two conductive layers. In the present invention, the sensing electrode layer is designed for equipping the two overlapped electrode patterns with the same voltage signals, so as to reduce the parasitic capacitance between the sensing electrode layer and the electrode film.

In detail, referring to FIGS. 2, 3, and 4, to reduce the parasitic capacitance between the sensing electrode layer 203 and the electrode film 105, the first sensing electrodes 300 and the second sensing electrodes 303 are alternately arranged in the first embodiment of the present invention, and the overlapped electrode patterns are designed to have the same signals. That is to say, when the first upper sensing electrode pattern 300a and the second lower shading electrode pattern 303b are respectively supplied with a signal having the same frequency and the same magnitude, there would not be capacitance between the first upper sensing electrode pattern 300a and the second lower shading electrode pattern 303b due to the same signal. Moreover, the second lower shading electrode pattern 303b can isolate signal coupling occurring between the first upper sensing electrode pattern 300a and the electrode film 105. In addition, the area of the first upper sensing electrode pattern 300a, the area of the first lower shading electrode pattern 300b, the area of the second upper sensing electrode pattern 303a, and the area of the second lower shading electrode pattern 303b are similar, which is conducive to isolation of signal coupling and reduction of the parasitic capacitance.

Second Embodiment

Figure 7:
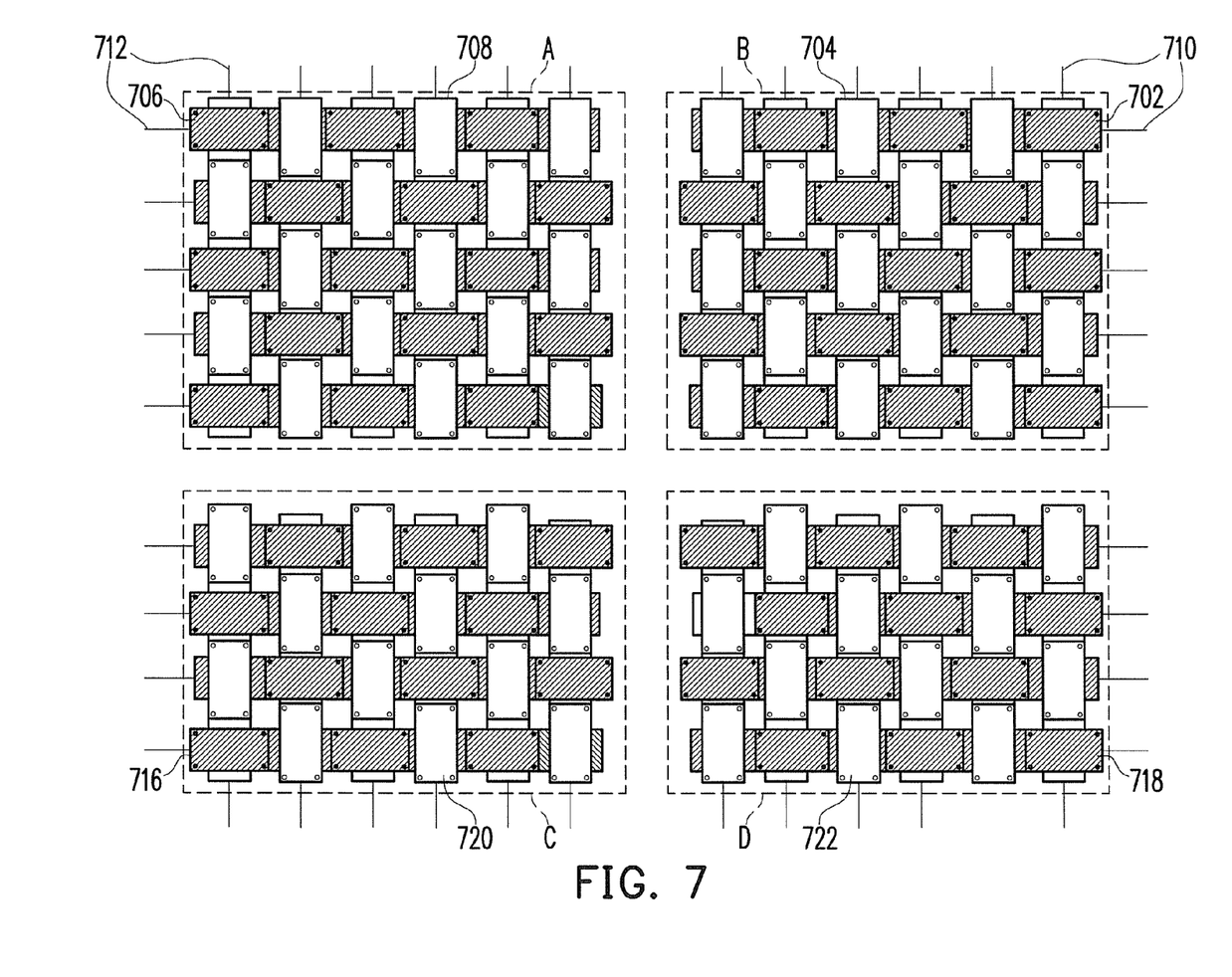
FIG. 7 is a schematic top view of a sensing electrode layer according to a second embodiment of the present invention.

FIG. 7 is a schematic top view of a sensing electrode layer according to a second embodiment of the present invention. Referring to FIG. 7, a sensing electrode layer 700 of the present embodiment is similar to the sensing electrode layer 203 depicted in FIG. 3, while the difference therebetween lies in that the sensing electrode layer 700 of the present embodiment is divided into at least two regions. In FIG. 7, the sensing electrode layer 700 is divided into four regions A, B, C, and D, while the number of the regions is not limited in the present invention.

As indicated in FIG. 7, first sensing electrodes 706 and second sensing electrodes 708 in the region A are electrically insulated from first sensing electrodes 702, 716, and 718 and second sensing electrodes 704, 720, and 722 in the other three regions B, C, and D. Besides, each of the first sensing electrodes 706 and each of the second sensing electrodes 708 are electrically connected to a peripheral circuit 712, respectively. Likewise, the first sensing electrodes 702 and the second sensing electrodes 704 in the region B are electrically insulated from the sensing electrodes in the other regions A, C, and D, and each of the first sensing electrodes 702 and each of the second sensing electrodes 704 in the region B are electrically connected to one of the peripheral circuits 710, respectively.

In light of the foregoing, the sensing electrode layer of the present invention is integrated in the display panel, which contributes to simplification of the entire manufacturing process of the display panel and reduction of thinning out the display panel. Additionally, the first sensing electrodes and the second sensing electrodes in the sensing electrode layer are overlapped and alternately arranged in the present invention, and the overlapped electrode patterns have the same voltage signals. Thereby, the parasitic capacitance between the sensing electrode layer and the electrode film is reduced, and the sensitivity of the sensing electrode layer is further increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display panel, comprising:
a first substrate, a pixel array being disposed on the first substrate;

a second substrate, a sensing electrode layer being disposed on the second substrate and comprising:
  a plurality of first sensing electrodes, arranged in a first direction, wherein each of the first sensing electrodes is constituted by alternately arranging a plurality of first upper sensing electrode patterns disposed above an insulating layer and a plurality of first lower shading electrode patterns disposed under the insulating layer such that the first upper sensing electrode patterns and the first lower shading electrode patterns are separated from each other by the insulating layer, and each of the first upper sensing electrode patterns is electrically connected to the adjacent first lower shading electrode patterns;
  a plurality of second sensing electrodes, arranged in a second direction and being electrically insulated from the first sensing electrodes, wherein each of the second sensing electrodes is constituted by alternately arranging a plurality of second upper sensing electrode patterns disposed above the insulating layer and a plurality of second lower shading electrode patterns disposed under the insulating layer such that the second upper sensing electrode patterns and the second lower shading electrode patterns are separated from each other by the insulating layer, and each of the second upper sensing electrode patterns is electrically connected to the adjacent second lower shading electrode patterns; and
  a display medium, sandwiched between the first substrate and the second substrate.

2. The display panel as claimed in claim 1, further comprising:
  a passivation layer, covering the sensing electrode layer; and
  an electrode film, located on the passivation layer.

3. The display panel as claimed in claim 2, wherein a thickness of the passivation layer disposed between the sensing electrode layer and the electrode film ranges from 10 μm to 50 μm.

4. The display panel as claimed in claim 1, wherein each of the first upper sensing electrode patterns is disposed above the corresponding second lower shading electrode pattern, and each of the second upper sensing electrode patterns is disposed above the corresponding first lower shading electrode pattern.

5. The display panel as claimed in claim 1, wherein the first upper sensing electrode patterns and the second upper sensing electrode patterns are co-planar, and the first lower shading electrode patterns and the second lower shading electrode patterns are co-planar.

6. The display panel as claimed in claim 1, wherein dimensions of the first upper sensing electrode patterns are substantially the same as dimensions of the second lower shading electrode patterns, and dimensions of the second upper sensing electrode patterns are substantially the same as dimensions of the first lower shading electrode patterns.

7. The display panel as claimed in claim 1, wherein an area of each of the first upper sensing electrode patterns, an area of each of the first lower shading electrode patterns, an area of each of the second upper sensing electrode patterns, or an area of each of the second lower shading electrode patterns is ½~⅔ of a unit sensing area.

8. The display panel as claimed in claim 7, wherein each of the first contact structures and each of the second contact structures are at least a contact plug or a continuous contact structure.

9. The display panel as claimed in claim 1, further comprising:
  a plurality of first contact structures, disposed in the insulating layer and each of the first contact structures being located between the first upper sensing electrode pattern and the first lower shading electrode pattern adjacent to each other, so as to electrically connect the first upper sensing electrode pattern and the first lower shading electrode pattern; and
  a plurality of second contact structures, disposed in the insulating layer and each of the second contact structures being located between the second upper sensing electrode pattern and the second lower shading electrode pattern adjacent to each other, so as to electrically connect the second upper sensing electrode pattern and the second lower shading electrode pattern.

10. The display panel as claimed in claim 1, further comprising a plurality of peripheral circuits, each of the peripheral circuits being electrically connected to one of the first sensing electrodes or one of the second sensing electrodes.

11. The display panel as claimed in claim 1, wherein the sensing electrode layer is divided into at least two regions, and the first sensing electrodes and the second sensing electrodes located in one of the at least two regions are electrically insulated from the first sensing electrodes and the second sensing electrodes located in the other of the at least two regions.

12. The display panel as claimed in claim 11, further comprising a plurality of peripheral circuits, each of the peripheral circuits being electrically connected to one of the first sensing electrodes or one of the second sensing electrodes in each of the at least two regions.

13. The display panel as claimed in claim 1, wherein a material of the first sensing electrodes and the second sensing electrodes comprises a transparent conductive material or metal.

14. The display panel as claimed in claim 1, wherein the second sensing electrodes and the first sensing electrodes are disposed on the same surface of the second substrate.

15. A sensing electrode layer, comprising:
  a plurality of first sensing units, each of the first sensing units comprising:
    a first upper sensing electrode pattern, disposed above an insulating layer; and
    a second lower shading electrode pattern, disposed under the insulating layer such that the first upper sensing electrode patterns and the second lower shading electrode patterns are separated from each other by the insulating layer, wherein the first upper sensing electrode pattern and the second lower shading electrode pattern are overlapped;
  a plurality of second sensing units, the second sensing units and the first sensing units being alternately arranged, each of the second sensing units comprising:
    a second upper sensing electrode pattern, disposed above an insulating layer; and
    a first lower shading electrode pattern, disposed under the insulating layer such that the second upper sensing electrode patterns and the first lower shading electrode patterns are separated from each other by the insulating layer, wherein the second upper sensing electrode pattern and the first lower shading electrode pattern being overlapped,
  wherein the first upper sensing electrode patterns and the first lower shading electrode patterns located in the same row are electrically connected, and the second upper sensing electrode patterns and the second lower shading electrode patterns located in the same column are electrically connected.

16. The sensing electrode layer as claimed in claim 15, wherein the first upper sensing electrode pattern and the second lower shading electrode pattern overlapped to each other have same signals.

17. The sensing electrode layer as claimed in claim 15, wherein the second upper sensing electrode pattern and the first lower shading electrode pattern overlapped to each other have same signals.

18. The sensing electrode layer as claimed in claim 15, wherein dimensions of the first upper sensing electrode patterns are substantially the same as dimensions of the second lower shading electrode patterns, and dimensions of the second upper sensing electrode patterns are substantially the same as dimensions of the first lower shading electrode patterns.

19. The sensing electrode layer as claimed in claim 15, further comprising:

at least a first contact structure disposed in the insulating layer and disposed between the first upper sensing electrode patterns and the first lower shading electrode patterns located in the same row to electrically connect the first upper sensing electrode patterns and the first lower shading electrode patterns; and at least a second contact structure disposed in the insulating layer and disposed between the second upper sensing electrode patterns and the second lower shading electrode patterns located in the same column to electrically connect the second upper sensing electrode patterns and the second lower shading electrode patterns.

20. The sensing electrode layer as claimed in claim 19, wherein the at least a first contact structure and the at least a second contact structure are at least a contact plug or a continuous contact structure.

* * * * *